US012566952B2

(12) United States Patent
Lorrain et al.

(10) Patent No.: US 12,566,952 B2
(45) Date of Patent: Mar. 3, 2026

(54) MULTIPLIER BY MULTIPLEXED OFFSETS AND ADDITION, RELATED ELECTRONIC CALCULATOR FOR THE IMPLEMENTATION OF A NEURAL NETWORK AND LEARNING METHOD

(71) Applicant: Commissariat à l'énergie atomique et aux énergies alternatives, Paris (FR)

(72) Inventors: Vincent Lorrain, Gif sur Yvette Cedex (FR); Olivier Bichler, Gif sur Yvette Cedex (FR); David Briand, Gif sur Yvette Cedex (FR); Johannes Christian Thiele, Gif sur Yvette Cedex (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 1149 days.

(21) Appl. No.: 17/448,123

(22) Filed: Sep. 20, 2021

(65) Prior Publication Data

US 2022/0092417 A1        Mar. 24, 2022

(30) Foreign Application Priority Data

Sep. 22, 2020        (FR) ...................................... 20 09591

(51) Int. Cl.
*G06N 3/08*                (2023.01)
*G06F 5/01*                (2006.01)
                            (Continued)

(52) U.S. Cl.
CPC ................. *G06N 3/08* (2013.01); *G06F 5/01* (2013.01); *G06F 7/50* (2013.01); *G06F 7/523* (2013.01); *G06N 3/063* (2013.01)

(58) Field of Classification Search
CPC .......... G06N 3/08; G06N 3/063; G06N 3/045; G06N 3/084; G06N 3/0895; G06N 3/09;
(Continued)

(56) References Cited

U.S. PATENT DOCUMENTS 4,926,371 A  *  5/1990  Vassiliadis ............ G06F 7/5336
                                                                708/628
12,182,621 B2 * 12/2024 Mahmoud ............ G06F 9/4881
(Continued)

FOREIGN PATENT DOCUMENTS

FR           3 085 517 A1      3/2020
WO      WO 2019/029785 A1     2/2019

OTHER PUBLICATIONS

P. Tummeltshammer, J. C. Hoe and M. Puschel, "Time-Multiplexed Multiple-Constant Multiplication," in IEEE Transactions on Computer-Aided Design of Integrated Circuits and Systems, vol. 26, No. 9, pp. 1551-1563 (Year: 2007).*

(Continued)

*Primary Examiner* — Emily E Larocque
*Assistant Examiner* — Maria De Jesus Rivera
(74) *Attorney, Agent, or Firm* — Oblon, McClelland, Maier & Neustadt, L.L.P.

(57)        ABSTRACT

A shift-and-add multiplier able to perform multiplication operations by multiplicative values, configured to receive as input a binary value and to deliver the product of the value and of a respective multiplicative value. It includes a set of shift units, each connected to the input and configured to perform a bit shift of the value received at the input, varying from one shift unit to another; and a set of summation units, configured to sum the outputs of the shift units. It includes a set of multiplexing unit(s) connected between the set of shift units and the set of summation unit(s), and a control unit configured to control the set of multiplexing unit(s) to (Continued)

select respective outputs of the shift units according to the multiplicative value and to deliver them to the set of summation unit(s).

19 Claims, 6 Drawing Sheets

(51) Int. Cl.
    *G06F 7/50*           (2006.01)
    *G06F 7/523*        (2006.01)
    *G06N 3/063*        (2023.01)

(58) Field of Classification Search
    CPC ........ G06N 3/091; G06N 3/092; G06N 3/094;
                G06N 3/096; G06N 3/0985; G06F 5/01;
                    G06F 7/50; G06F 7/523; G06F 7/5443
    See application file for complete search history.

(56) References Cited

U.S. PATENT DOCUMENTS

| | | | | |
|---|---|---|---|---|
| 12,254,061 | B2 * | 3/2025 | Urbanski | .............. G06F 7/5443 |
| 2019/0147323 | A1 * | 5/2019 | Li | .......................... G06N 3/048 |
| | | | | 706/15 |
| 2020/0257930 | A1 * | 8/2020 | Nahr | ...................... G06V 10/82 |
| 2021/0051328 | A1 * | 2/2021 | Sharman | ............... H04N 19/13 |

OTHER PUBLICATIONS

French Preliminary Search Report issued Jun. 4, 2021 in French Application 20 09591 filed on Sep. 22, 2020, 3 pages (with English Translation of Categories of Cited Documents).
Tummeltshammer et al., "Time-Multiplexed Multiple-Constant Multiplication", IEEE Transactions On Computer-Aided Design of Integrated Circuits and Systems, vol. 26, No. 9, Sep. 2007, pp. 1551-1563.

* cited by examiner

Determination of a set of allowed values for the parameter values of the neural network ⌐100

Learning of the parameter values of the neural network as a function of the set of allowed values ⌐110

<u>FIG.5</u>

MULTIPLIER BY MULTIPLEXED OFFSETS AND ADDITION, RELATED ELECTRONIC CALCULATOR FOR THE IMPLEMENTATION OF A NEURAL NETWORK AND LEARNING METHOD

CROSS-REFERENCE TO RELATED APPLICATIONS

This application is a U.S. non-provisional application claiming the benefit of French Application No. 20 09591, filed on Sep. 22, 2020, which is incorporated herein by reference in its entirety.

FIELD

The present invention relates to a shift-and-add multiplier able to perform multiplication operations by multiplicative values, the multiplier being configured to receive as input a value expressed in binary form and to deliver as output the product of the value received as input and a respective multiplicative value.

The invention also relates to an electronic calculator configured to implement an artificial neural network, comprising a plurality of such shift-and-add multipliers, each of which is able to perform multiplication operations by parameter values of the neural network.

The invention also relates to a method of learning parameter values of an artificial neural network to be implemented by such an electronic calculator; the learning method being computer-implemented.

The invention then concerns the field of the architecture of electronic calculators for implementing artificial neural networks, also known as ANNs (Artificial Neural Networks).

Such calculators offer, via the implementation of these neural networks, numerous applications, such as, for example, the classification or identification of objects previously detected by an object detector, making it possible, for example, to learn the identities of people whose faces have been detected by a face detector. Another example of the application is the automatic and unsupervised learning of features, such as human voice features, and the learned features are then used to preprocess data for specialized learning about a person's voice.

The invention relates in particular to the field of deep neural networks, also known as DNNs (Deep Neural Networks). In this field, one of the most used topologies is the convolutional neural network, also called CNN (Convolutional Neural Networks).

BACKGROUND

Among the multipliers able to perform multiplication operations with a multiplicative value, or constant, it is known that a shift-and-add multiplier is configured to receive as input a value expressed in binary form and to deliver as output the product of the value received as input and the constant.

Such a shift-and-add multiplier typically comprises a plurality of shift units, each shift unit being connected to the input and configured to shift the input value to the left by a predefined number of bits; and a set of summation unit(s) connected directly to the output of the shift units and configured to sum the outputs of the shift units. The predefined number of shift bits for each shift unit is a function of the value of the constant to be multiplied with the received input value.

Such a multiplier is then easily realizable in the form of one or more dedicated integrated circuits, such as one or more ASICs (Application-Specific Integrated Circuit), the shift units being directly realizable by wiring and the hardware resources required for the set of summation units being less, compared to a conventional multiplier.

However, the use of such multipliers to perform all the multiplication operations by the weight values of a processing layer of the neural network, or even by the weight values of said entire neural network, would result in a too complex hardware implementation.

Multipliers that can perform multiplication operations with different multiplicative values, also called multi-constant multipliers, are also known. Such multipliers, such as the multipliers of the Spiral project at Carnegie Mellon University, generally seek to mutualize computational resources of different multiplicative values, in order to reduce the overall complexity of the multiplier.

However, if the operators used are not completely combinatorial, which is most often not the case, this will introduce a different time latency for each multiplicative value. These different latencies are then extremely complex to manage in the calculator including such multipliers, for the implementation of the neural network.

SUMMARY

The aim of the invention is then to propose a shift-and-add multiplier able to perform multiplication operations by different multiplicative values, while minimizing a possible difference between temporal latencies for these different values.

To this end, the object of the invention is a shift-and-add multiplier able to perform multiplication operations by multiplicative values, the multiplier being configured to receive as input a value expressed in binary form and to deliver as output the product of the value received as input and a respective multiplicative value, the multiplier comprising:

a set of several shift units, each shift unit being connected to the input and configured to perform a shift of P bits of the value received at the input, where P is between 0 and N−1, with N number of bits of the binary form at the input, and P varies from one shift unit to another.

a set of summation unit(s), configured to sum the outputs of the shift units.

the multiplier further comprising a set of multiplexing unit(s) connected between the set of shift units and the set of summation unit(s), and a control unit configured to control the set of multiplexing unit(s) to select, based on the respective multiplicative value, respective outputs of the shift units and deliver them to the set of summation units.

Thus, by virtue of the set of multiplexing unit(s) connected between the set of shift unit(s) and the set of summation unit(s), the shift-and-add multiplier according to the invention forms a multiplexed shift-and-add multiplier.

This multiplexed shift-and-add multiplier makes it possible to easily perform multiplication operations for different multiplier values, with the additional possibility of constraining that these different multiplier values comprise, when expressed in binary form, at most K non-zero bits, or even exactly K non-zero bits, where K is an integer greater than or equal to 1.

The possibility of imposing the maximum number K of non-zero bits offered by the multiplier according to the invention through its set of multiplexing units connected between the set of shift units and the set of summation units, this set of multiplexing units further explaining the terminology of multiplexed shifts, then allows to limit or reduce the number of summation units within the set of summation units, in comparison with a shift-and-add multiplier of the state of the art. This limited or reduced number of summation units therefore allows a higher computation speed and a lower power consumption.

The pre-determination of the maximum number K of non-zero bits for each multiplexed shift-and-add multiplier according to the invention is typically carried out during the learning of parameter values, such as weight and/or bias values, of an artificial neural network intended to be implemented by an electronic calculator comprising a plurality of such multiplexed shift-and-add multipliers, as will be described in more detail hereafter.

The multiplexed shift-and-add multiplier according to the invention also minimizes a possible difference between time latencies for the respective multiplicative values, due to the use of the same shift units, set of multiplexing units and set of summation units, regardless of the multiplicative value.

Preferably, the set of summation units is in the form of an adder tree, which further minimizes this possible difference between time latencies.

According to other advantageous aspects of the invention, the multiplier comprises one or more of the following features, taken alone or in any technically possible combination:

if at least one value is signed among the received values and the respective multiplicative value, each signed value is coded with a sign bit encoding.

if the respective multiplicative value is signed, the multiplier further comprises a calculation unit configured to calculate a sign bit of the product of the received input value and the respective multiplicative value and to concatenate the sign bit to the delivered output value of the set of summation units, the calculation unit being connected to the input and to the control unit, the calculation unit preferably being configured to calculate said sign bit according to each signed value of the received input value and the respective multiplicative value, the calculation unit preferably further comprising a look-up table.

the set of summation unit(s) further comprises a constant addition unit, for adding a bias value to the respective multiplicative value; and the set of summation units is in the form of a tree, the set of summation units comprising, for each respective pair of multiplexing units, an summation unit connected to the output of said pair of multiplexing units; and if the number of multiplexing units is greater than 2, the set of summation units comprising one or several more summation units, each connected to the output of a respective pair of summation units.

Another object of the invention is an electronic calculator configured to implement an artificial neural network, the calculator comprising a plurality of shift-and-add multipliers, each able to perform multiplication operations by parameter values, such as weight values, of the neural network, wherein at least one, preferably each shift-and-add multiplier is as defined above, the multiplicative values being said parameter values.

According to another advantageous aspect of the invention, the calculator comprises the following feature:

the calculator is implemented as one or more dedicated integrated circuits, such as one or more ASICs.

Another object of the invention is a method for learning parameter values, such as weight and/or bias values, of an artificial neural network to be implemented by an electronic calculator as defined above, the method being computer implemented and comprising the following step:

learning parameter values, such as weight and/or bias values, of the neural network, from training data.

the method further comprising, prior to the learning step, a step of determining a set of allowed values for the parameter values of the neural network the learning step being carried out in particular according to the set of allowed values, each learned parameter value of the neural network being among the set of allowed values, and the set of allowed values consists of the values which, when expressed in binary form, includes at most K non-zero bits, where K is an integer greater than or equal to 1, the set of allowed values preferably consisting of values which, when expressed in binary form, include exactly K non-zero bits.

According to other advantageous aspects of the invention, the learning method comprises one or more of the following features, taken alone or in any technically possible combination:

the determining step further includes estimating one element of a gradient value look-up table for the set of allowed values and a derivable function modeling the set of allowed values, and the learning step is performed via a backpropagation algorithm for calculating the gradient of each parameter of the neural network, the gradient being calculated from the estimated element; and the maximum number K of non-zero bits is predefined, preferably for each shift-and-add multiplier, the number K being variable from one multiplier to another.

BRIEF DESCRIPTION OF THE DRAWINGS

These features and advantages of the invention will become clearer upon reading the following description, given only as a non-limiting example, and made with reference to the attached drawings, in which.

DETAILED DESCRIPTION

Figure 1:
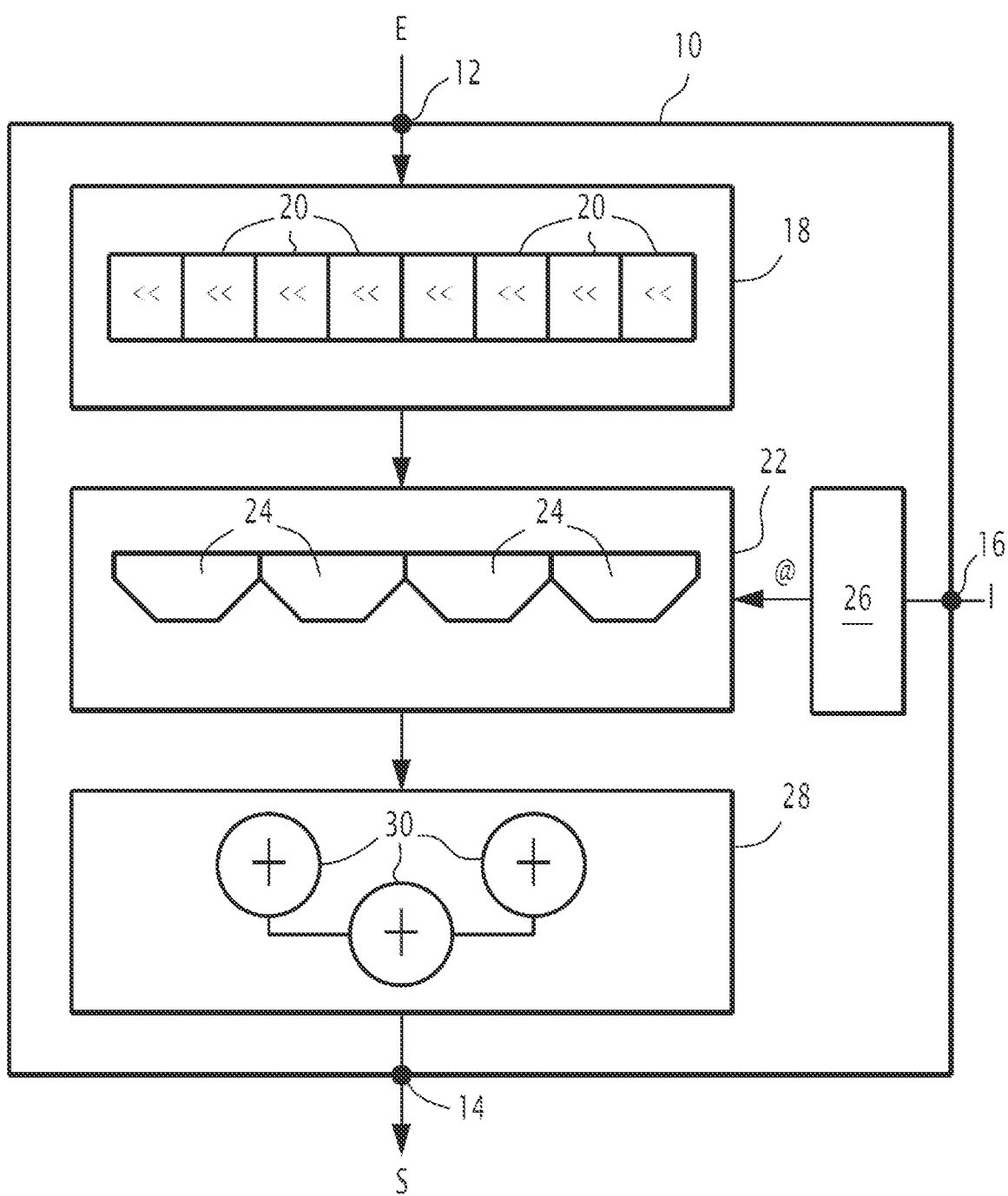
FIG. 1 is a schematic representation of a multiplexed shift-and-add multiplier able to perform multiplication operations by different multiplicative values, by receiving as input a value expressed in binary form and delivering as output the product of the value received as input and a respective multiplicative value, according to a first embodiment of the invention.

In FIG. 1, a multiplexed shift-and-add multiplier 10 is able to perform multiplication operations by multiplicative values, and comprises an input bus 12, an output bus 14 as well as a control terminal 16.

The multiplexed shift-and-add multiplier 10 is configured to receive as input, i.e., on its input bus 12, a value E expressed in binary form, and to deliver as output, i.e., on its output bus 14, an output S equal to the product of the value E received as input and a respective multiplicative value, the respective multiplicative value typically being determined from a control instruction I received at the control terminal 16.

The multiplexed shift-and-add multiplier 10, also referred to hereinafter as multiplier 10 for brevity, includes a first set 18 of a plurality of shift units 20, each shift unit 20 being able to perform a P-bit shift of the received input value.

According to the invention, the multiplier 10 further comprises a second set 22 of multiplexing units 24, connected to the output of the first set 18 of shift units 20, as well as a unit 26 for controlling the second set 22 of multiplexing unit(s) 24.

The multiplier 10 also comprises a third set 28 of summation units 30, connected to the output of the second set 22 of multiplexing units 24 and configured to sum the outputs of the shift units 20 selected by said second set 22 of multiplexing units 24.

The first set 18 comprises a plurality of shift units 20. The first set 18 comprises, for example, N shift units 20, where N is the number of bits of the binary form received as input to the multiplier 10. The first set 18 is also referred to as a shifter module.

In the example shown in FIG. 1, the binary form of the value E received on the input bus 12 consists of 8 bits, i.e., N is equal to 8, and the first set 18 then typically includes eight shift units 20.

Each shift unit 20 is connected to the input bus 12, so that it can perform a shift of a certain number of bits of the received input value in parallel and separately from the other shift units 20.

Each shift unit 20 is known per se and is configured to perform a shift of P bits of the received input value E, where P is between 0 and N−1, with N the number of bits of the input binary form, P varying from one shift unit 20 to another. The skilled person will observe that an N-bit shift is identical to a 0-bit shift, where N is the number of bits of the input binary form of the shift unit 20, so that P is similarly between 1 and N.

The P bit shift performed by each shift unit 20 is typically a P bit shift to the left of the binary value E, so as to perform a 2P multiplication of that binary value E for P between 0 and N−1.

The skilled person will observe that the number of shift units 20 forming the first set 18 is less than or equal to the number N of bits of the binary form received on the input bus 12. This number of shift units 20 included in the first set 18 is not necessarily equal to the number N of bits of the binary form received at the input. The number of shift units 20 typically and preferably depends on the different multiplicative values that the considered multiplier 10 will have to be able to multiply to the binary value E received on the input bus 12, in particular on a maximum number K of non-zero bits of the list of the different multiplicative values associated with said multiplier 10. The number of shift units 20 is in particular still equal to the number of distinct positions at which a non-zero bit, i.e., a 1-bit, is located among the binary forms of the various multiplicative values associated with said multiplier 10.

The second set 22 of multiplexing units 24 is connected between the first set 18 of shift units 20 and the third set 28 of summation unit(s) 30. The second set 22 is also connected to the control unit 26.

The second set 22 comprises one or more multiplexing units 24 and is also referred to as a multiplexing module. The number of multiplexing units 24 forming the second set 22 typically depends on the list of different multiplicative values associated with the multiplier 10. The number of multiplexing units 24 contained in the second set 22 is greater than or equal to the maximum number K of non-zero bits, and typically equal to said maximum number K.

The multiplexing module is then able to simultaneously effect multiplexing up to K shifts performed simultaneously by the shift unit, when the multiplicative value to be processed by the multiplier 10 includes at most K non-zero bits.

The second set 22 of multiplexing units 24 is configured to select, according to a respective multiplicative value, one or more corresponding outputs of the shift units 20 of the first set 18 and to deliver them to the third set 28 of summation unit(s) 30.

The second set 22 is, for example, configured to make said selection of the corresponding output(s) of the shift units 20 according to a control signal received from the control unit 26, this control signal representing the respective multiplicative value.

The connections between the multiplexing units 24 of the second set 22 and the corresponding output of the shift units 20 are determined from the list of multiplicative values associated with the multiplier 10, as illustrated through an example of implementation below.

Each multiplexing unit 24 has, for example, M inputs and one output, where M is the number of different multiplicative values to be processed by the multiplier 10 and where each input and output is in the form of an N-bit word. In other words, each multiplexing unit 24 is able to receive M×N bits as input and deliver N bits of output.

Each multiplexing unit 24 is typically configured to deliver an output of one of the M words of N bits received as input, and this according to the value of the control signal received from the control unit 26, i.e. according to the multiplicative value to be processed by the multiplier 10.

The control unit 26 is configured to control the second set 22 of multiplexer units 24 to select the respective outputs of the shift units 20 of the first set 18, depending on the respective multiplicative value, and to deliver, to the third set 28 of summation units 30, the bit values present at these outputs of the shift units 20.

The control unit 26 is, for example, configured to receive via the control terminal 16 the instruction I indicating the respective multiplicative value to be multiplied with the binary value E received on the input bus 12, and then to convert this instruction I corresponding to the multiplicative value into a control signal transmitted to the multiplexing unit 24 to perform the selection of the outputs of the shift units 20 corresponding to said multiplicative value. The control signal transmitted from the control unit 26 to each multiplexing unit 24 is typically in the form of an @ address, where each value of the @ address corresponds to a respective predefined multiplicative value.

The third set 28 of summation units 30 is connected to the output of the second set 22 and is configured to sum the outputs of the shift units 20 selected by the multiplexing unit 24 of the second set 22.

The third set 28 includes one or more summation units 30 and is also referred to as an adder module. Each summation unit 30 is configured to sum the values received at its inputs.

The number of inputs to the third set 28, i.e., the number of inputs to the summation units 30 that are directly connected to the output of a respective multiplexing unit 24, is equal to the number of multiplexing units 24 within the second set 22, with each input in the form of an N-bit word.

As an optional complement, the third set 28 of summation units 30 is in the form of a tree, such as an adder tree.

According to this optional complement, the third set 28 of summation units 30 includes, for each respective pair of multiplexing units 24, an summation unit 30 connected to the output of said pair of multiplexing units 24. If the number of multiplexing units 24 is greater than 2, then the third set 28 includes one or more further summation units 30, each connected to the output of a respective pair of summation units 30, so as to form the aforementioned tree.

As a further optional addition, the third set 28 of summation units 30 further comprises a constant addition unit, not shown, for adding a bias value to the respective multiplicative value.

Each summation unit 30 is, for example, a two-input adder, and is then configured to sum the values received at its two inputs. Each adder then includes two inputs and one output, where the inputs and output are each in the form of an N-bit word. In other words, each adder is able to receive 2×N bits as input and deliver N bits as output.

As an example of implementation, consider a multiplier 10 with N=4, M=3 and K=2, i.e., a multiplier 10 able to receive 4-bit input values E and delivering 4-bit outputs S, with 3 associated multiplicative values, each multiplicative value having at most 2 non-zero bits.

In this example, the multiplexing module then typically includes two multiplexing units 24, each multiplexing unit 24 having three inputs of 4 bits each and one output of 4 bits. Each input to each multiplexing unit 24 is associated with a respective multiplicative value. For example, a first address @0 is associated with a first multiplicative value, such as 5, or 0101 in binary, for selecting a first input of each multiplexing unit 24; a second address @1 is associated with a second multiplicative value, such as 4, or 0100 in binary, for selecting a second input of each multiplexing unit 24; and a third address @2 is associated with a third multiplicative value, such as 10, or 1010 in binary, for selecting a third input of each multiplexing unit 24.

To perform a multiplication by the first multiplicative value equal to 0101, it is necessary to perform a 0-bit shift and a 2-bit shift, so that the first input of one multiplexing unit 24 is connected to the output of the shift unit 20 having P=0, and the first input of the other multiplexing unit 24 is connected to the output of the shift unit 20 having P=2.

To perform a multiplication by the second multiplicative value equal to 0100, it is necessary to perform a single 2-bit shift, so that the second input of one multiplexing unit 24 is connected to the output of the shift unit 20 having P=2, with the second input of the other multiplexing unit 24 not being connected to any shift unit 20.

Finally, in order to perform a multiplication by the third multiplicative value equal to 1010, it is necessary to perform a 1-bit shift and a 3-bit shift, so that the third input of one multiplexing unit 24 is connected to the output of the shift unit 20 having P=1, and the third input of the other multiplexing unit 24 is connected to the output of the shift unit 20 having P=3.

In this example, the adder module includes a single summation unit 30, namely a single adder with two 4-bit inputs. This adder is connected to the output of the two multiplexing units 24 and is then configured to sum the 2 4-bit words simultaneously provided at the output of the multiplexing module via its two multiplexing units 24.

The result of the multiplication of the 4-bit input value E by one of the first, second and third multiplicative values is then the sum of the 2 words of 4 bits provided at the output of the multiplexing module, each being the result of a respective shift of P bits to the left of the input value E, with the aforementioned values for P according to the multiplicative value considered.

The skilled person will then observe that the same shift unit 20 is likely to be connected to several distinct inputs of the multiplexing module, such as distinct inputs of the same multiplexing unit 24 or inputs of distinct multiplexing units 24, this case of figure occurring when two distinct multiplicative values present in their binary form a non-zero bit, i.e. a bit at 1, in the same position, as illustrated in the preceding example for the bit at 1 in the 3rd position in the multiplicative values 0101 and 0100, P then being equal to 2.

The skilled person will also note that one or more inputs of the multiplexing module may be connected to no shift unit 20, this case occurring when one or more multiplicative values present a non-zero number of bits, i.e. a number of bits at 1, strictly less than the maximum number K, as illustrated in the preceding example for the second multiplicative value equal to 0100 with a single bit at 1 and K equal to 2.

Figure 2:
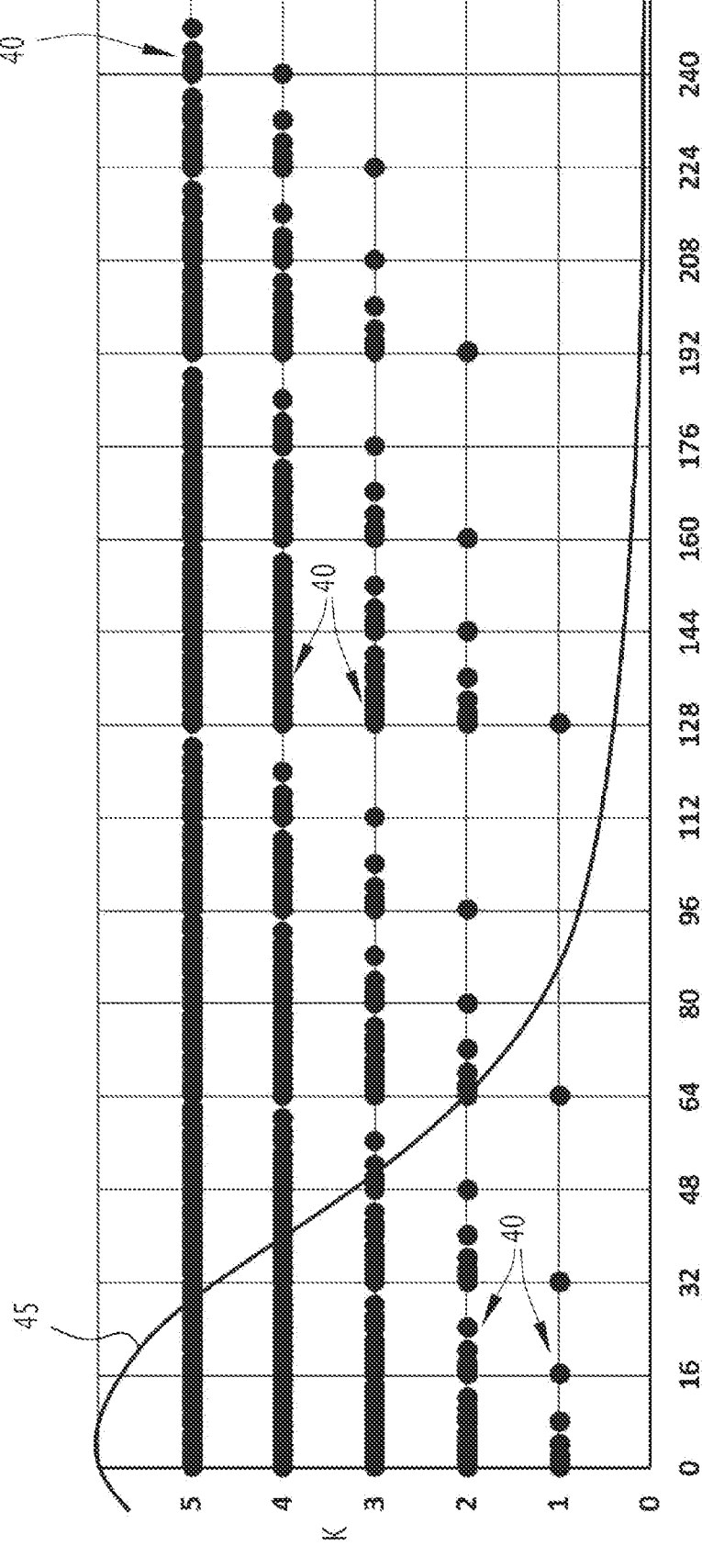
FIG. 2 is a diagram illustrating the different possible values for the multiplicative value used by the multiplier of FIG. 1, according to a maximum number of non-zero bits of the binary form of said multiplicative value.

In the example of FIG. 1, the binary value E received on the input bus 12 and each respective multiplicative value are assumed to be unsigned values, and the list of possible multiplicative values according to the maximum number K of non-zero bits is shown in FIG. 2.

In FIG. 2, for each value of the maximum number K of non-zero bits, between 1 and 5, the possible multiplicative values are represented as a horizontal row 40 of dots with each dot corresponding to a possible multiplicative value. A curve 45 further schematically represents a histogram of weight values of an artificial neural network RN to be implemented by an electronic calculator 50 according to the invention, which will be described in more detail below.

The value of the maximum number K of non-zero bits is then preferably greater than or equal to 2, in order to provide a sufficient number of possible multiplicative values. The value of said maximum number K is typically between 2 and 6, and preferably still between 3 and 5.

The skilled person will observe that these possible multiplicative values, visible on FIG. 2, correspond to decompositions in powers of 2, where the maximum number of powers of 2 corresponds to the maximum number K of non-zero bits.

Figure 3:
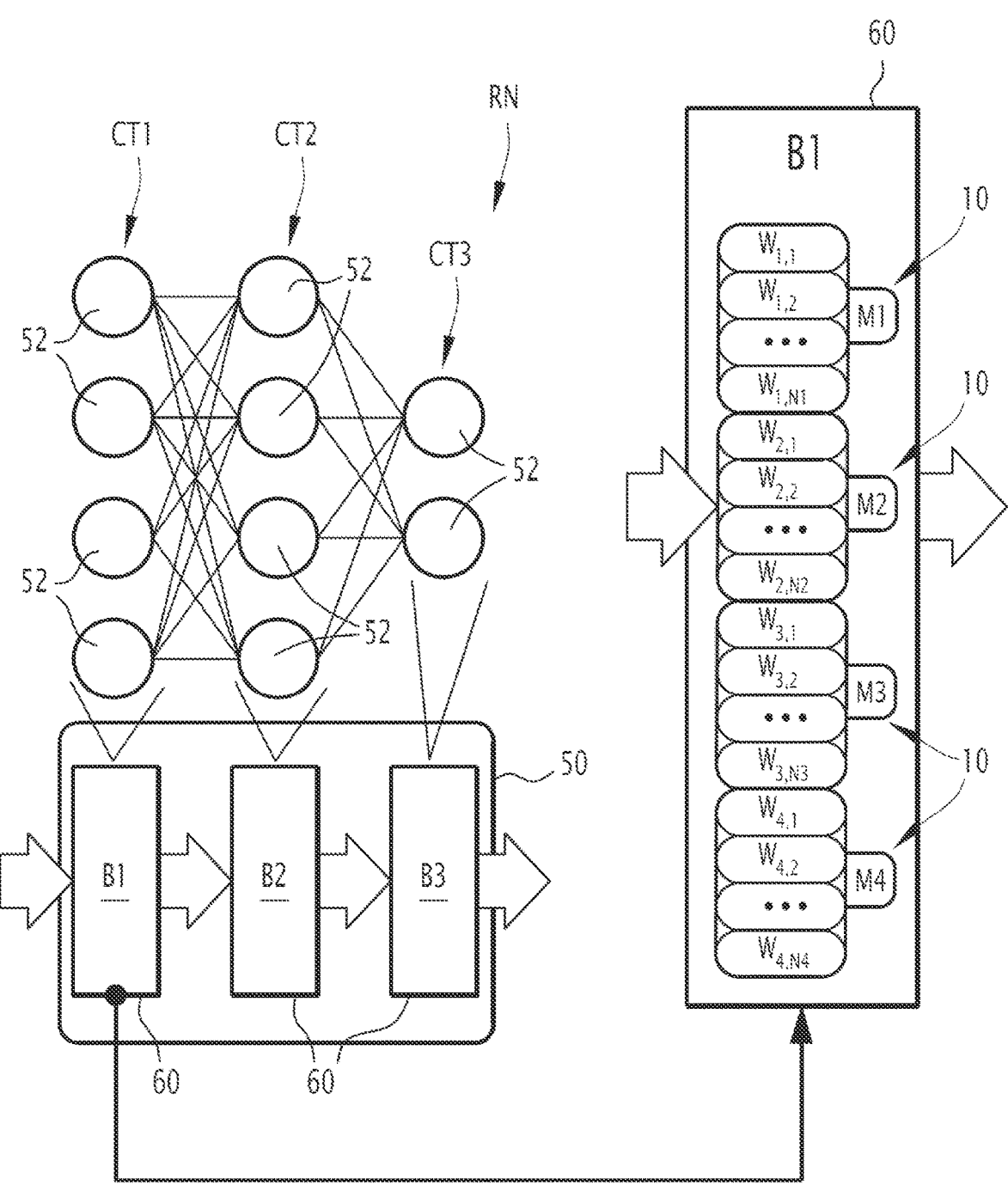
FIG. 3 is a schematic representation of an electronic calculator configured to implement an artificial neural network, the calculator comprising a plurality of shift-and-add multipliers, at least one, and preferably each, shift-and-add multiplier being such as that of FIG. 1.

In FIG. 3, the electronic calculator 50 according to the invention is configured to implement the artificial neural network RN, the latter typically including several successive processing layers CTi, where i is an integer index greater than or equal to 1. In the example of FIG. 3, the index i is for example equal to 1, 2 and respectively 3, with the first CT1, second CT2 and third CT3 processing layers shown in this FIG. 3. Each respective processing layer CTi includes, as known per se, one or more artificial neurons 52, also called formal neurons.

The processing layers CTi are typically arranged successively within the neural network RN, and the artificial neurons 52 of a given processing layer are typically connected at their input to the artificial neurons 52 of the previous layer, and at their output to the artificial neurons 52 of the next layer. The artificial neurons 52 of the first layer, such as the first processing layer CT1, are connected on their input to the input variables, not shown, of the neural network RN, and the artificial neurons 52 of the last processing layer, such as the third processing layer CT3, are connected on their output to the output variables, not shown, of the neural network RN. In the example shown in FIG. 3, the second processing layer CT2 then forms an intermediate layer whose artificial neurons 52 are connected on the input side to the artificial neurons 52 of the first processing layer CT1, and on the output side to the artificial neurons 52 of the third processing layer CT3.

As known per se, each artificial neuron 52 is associated with an operation, i.e., a type of processing, to be performed by said artificial neuron 52 within the corresponding processing layer. Each artificial neuron 52 is typically able to perform a weighted sum of values received as input from the element(s) connected to its input, such as input variables or other artificial neurons 52, each input value of the neuron 52 being then multiplied by a respective weight value, then applying an activation function, typically a non-linear function, to said weighted sum, and delivering to the element(s) connected to its output the value resulting from the application of said activation function. As an optional complement, the artificial neuron 52 is also able to further apply a multiplicative factor, also referred to as bias, to the output of the activation function, and the value delivered to the element(s) connected to the output, such as output variables or artificial neurons 52 of the next layer, is then the product of the bias value and the output value of the activation function.

The electronic calculator 50 comprises, for example, a plurality of electronic computing blocks 60, each configured to implement a respective processing layer CTi. In the example shown in FIG. 3, the electronic calculator 50 comprises three electronic computing blocks 60, namely a first computing block B1 able to implement the first processing layer CT1, a second computing block B2 able to implement the second processing layer CT2, and a third computing block B3 able to implement the third processing layer CT3.

The electronic calculator 50 comprises a plurality of shift-and-add multipliers, each of which is able to perform operations of multiplication by parameter values of the neural network RN, such as weight and/or bias values.

According to the invention, at least one, preferably each shift-and-add multiplier is the multiplier 10 previously described with respect to FIG. 1, the multiplicative values then being said parameter values of the neural network RN, such as weight and/or bias values.

In the example of FIG. 3, the first computing block B1 comprises said plurality of shift-and-add multipliers. In this example of FIG. 1, all of the shift-and-add multipliers are multiplexed shift-and-add multipliers 10, as previously described with respect to FIG. 1.

In the example of FIG. 3, the first computing block B1 includes four shift-and-add multipliers 10, namely a first multiplier M1, a second multiplier M2, a third multiplier M3 and a fourth multiplier M4. In this example of FIG. 3, the weight values forming the multiplicative values are respectively denoted $W_{j,k}$ where j is an integer index of value greater than or equal to 1 and denoting the corresponding multiplexed shift-and-add multiplier 10, and k is an integer index of value greater than or equal to 1 and denoting the weight value among all the weight values associated with this multiplier 10. As an example, the weight values associated with the first multiplier M1 are then noted $W_{1,1}$, $W_{1,2}, \ldots, W_{1,N1}$ where N1 represents the number of weight values, i.e. the number of multiplicative values, associated with the first multiplier M1 which is a multiplexed shift-and-add multiplier 10 according to the invention.

The electronic calculator 50 is for example realized in the form of one or more dedicated integrated circuits, such as one or more ASICs (*Application Specific Integrated Circuit*).

Figure 4:
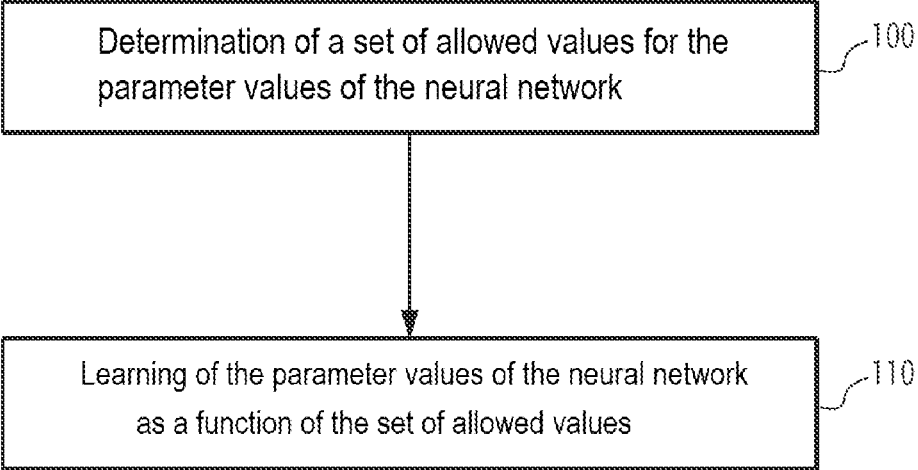
FIG. 4 is a flowchart of a method, according to the invention, of learning parameter values of the artificial neural network intended to be implemented by the electronic calculator of FIG. 3.

The learning of parameter values, such as weight and/or bias values, of the artificial neural network RN intended to be implemented by the electronic calculator 50 according to the invention, will now be described with reference to FIG. 4 representing a flowchart of a method for learning, according to the invention, such parameter values of the artificial neural network RN.

In an initial step 100, a set of allowed values for the parameter(s) to be learned, such as weight value and/or bias value, is determined.

In this step 100 of determining the set of allowed values for the parameter values of the neural network RN, a constraint is imposed on the number of non-zero bits of the binary value for each parameter intended to be learned. In particular, the set of allowed values consists of the values which, when expressed in binary form, include at most K non-zero bits, where K is an integer greater than or equal to 1. The set of allowed values is for example the values which, when expressed in binary form, have exactly K non-zero bits.

A complementary constraint is that the set of allowed values is between a minimum value $Q_{min}$ and a maximum value $Q_{max}$, and the maximum value $Q_{max}$ tests for example the following equation:

$$Q_{max} = \sum_{b=N-K_{ex}}^{N-1} 2^b \qquad \text{[Math 1]}$$

where $Q_{max}$ represents the maximum value of the allowed value set, $K_{ex}$ represents the exact number of non-zero bits of the binary value, N represents the total number of bits of the binary value.

An additional optional constraint is to impose that the maximum value $Q_{max}$ forms a clipping value, and then all learned parameter values greater than or equal to $Q_{max}$ are clipped to this maximum value $Q_{max}$.

When the constraint for the set of allowed values is that it consists of the values that include exactly $K_{ex}$ non-zero bits, the number NA of allowed values typically tests the following equation:

$$NA = \frac{N!}{(N - K_{ex})! \cdot K_{ex}!} \qquad \text{[Math 2]}$$

where NA represents the number of values in the set of allowed values.

N represents the total number of bits of the binary value; and $K_{ex}$ represents the exact number of non-zero bits of the binary value, and ! represents the factorial notation.

For $K_{ex}$=1 and N=3, then the NA number of allowed values is therefore equal to 3, namely the following values: 001, 010 and 100. Similarly, for $K_{ex}$=2 and N=4, the NA number of allowed values is equal to 6, namely the following six values: 0011, 0101, 0110, 1001, 1010 and 1100.

When the constraint relating to the set of allowed values is to have at most K non-zero bits, the set of allowed values is determined, for example, via a look-up table.

Alternatively, this set of allowed values with at most K non-zero bits, is determined by subtracting from a target value the largest power of 2 lower than this target value, then by subtracting from the remainder of this initial subtraction, the largest power of 2 which is lower than said remainder, and so on. The allowed value is then the sum of the powers of 2 thus obtained. As an example, if the target value is equal to 13, and that K=2 and N=4, the greatest power of 2 lower than 13 is 8, and the remainder of the initial subtraction is then equal to 5, and the greatest power of 2 lower than or equal to the remainder 5 is then 4, so that the allowed value closest to the target value 13 and having at most 2 non-zero bits is 12, corresponding to the binary value at 1100.

As an optional complement, noting Q as a quantization function defining the set of allowed values Q(x) for the parameters of the neural network RN, the skilled person will observe that the function Q is not derivable, since the possible values Q(x) for the function Q form a set of discrete values.

As an optional complement, the determination state 100 then further includes estimating an element from a gradient value look-up table for the set of allowed values and a derivable function F modeling the set of allowed values.

According to this optional complement, when it is necessary to derive the quantization function Q during a subsequent step 110 of learning the values of parameters of the neural network RN, typically when this learning step 110 includes a back propagation algorithm for the calculation of the gradient of each parameter of the neural network RN, then the gradient is calculated from the estimated element, i.e. from the gradient value look-up table for the set of allowed values or from a derivative of the derivable function F that models the set of allowed values.

When the set of allowed values corresponds approximately to a uniform distribution of values, the derivable function F is, for example, the linear function satisfying F(x)=x.

Alternatively, when the distribution of allowed values is not a uniform distribution, typically when many values are concentrated around a low value, or a high value, it is preferable to choose a more complex function than the aforementioned linear function, and the derivable function is for example a piecewise affine function that is defined analytically, either by fitting or by experimentation, or an interpolation function corresponding to the non-uniform distribution, such as a spline interpolation function of the points.

Alternatively, the calculation of the gradient of each parameter of the neural network is performed via the gradient value look-up table for the set of allowed values, and at each allowed value, i.e. at each possible value Q(x) of the quantization function Q, is associated with a gradient value in the look-up table.

In the learning step 110, the values of the parameters of the neural network RN, these parameters typically being weight values and/or bias values, are learned from training data, as known per se.

According to the invention, the learning step 110 is then performed in addition, according to the set of allowed values, each learned value of the parameter of the neural network RN having to be chosen from the set of allowed values. The skilled person will then understand that this set of allowed values, i.e., the possible values Q(x) of the quantization function Q, forms a constraint during the learning step 110.

As an optional complement, the learning step 110 is performed via a backpropagation algorithm for calculating the gradient of each parameter of the neural network RN, and the gradient is then calculated from the element estimated in the initial determination step 100, this estimated element being selected from the gradient value look-up table for the set of allowed values and the derivable function F modeling the set of allowed values, i.e., modeling the quantization function Q that is non-derivable.

The skilled person will then observe that the maximum number K of non-zero bits is predefined and likely to differ from one multiplexed shift-and-add multiplier 10 to another within the calculator 50 according to the invention.

As an example, when the artificial neural network RN includes several processing layers CTi, the learning step 110 is typically performed separately for each layer CTi of the neural network RN, and the determination step 100 is also performed separately for each layer, with the possibility of having a value of the maximum number K of non-zero bit(s) that varies from one processing layer CTi to another, and then from one multiplexed shift-and-add multiplier 10 to another when the neural network RN is implemented by the electronic calculator 50 according to the invention. Indeed, during this implementation, each processing layer CTi is associated with a set of multiplexed shift-and-add multipliers 10 according to the invention.

Thus, the multiplexed shift-and-add multiplier 10 according to the invention allows multiplication operations to be carried out efficiently for different multiplicative values and also offers the possibility of imposing that these different multiplicative values include, when expressed in binary form, at most K non-zero bits, or even exactly K non-zero bits, with K an integer greater than or equal to 1. This possibility of constraining the number of non-zero bits offered by the multiplier 10 according to the invention by its set 22 of multiplexing units 24 connected between the set 18 of shift units 20 and the set 28 of summation units 30 then allows to have a limited number of summation units 30 within the third set 28, this number of summation units 30 typically depending on the number of multiplexing units 24, which itself depends on the maximum number K of non-zero bits which is typically predetermined for each multiplier 10 according to the invention.

As an example, when the maximum number K of non-zero bits is equal to 3 or respectively 4, the number of multiplexing units 24 is equal to 3 or respectively 4, and the number of summation units 30 is typically equal to 3 when the third set 28 is tree-shaped.

When the maximum number K of non-zero bits is equal to 5 or 6, the number of multiplexing units 24 is equal to 5 or 6, and the number of summation units is typically equal to 6.

In addition, when the maximum number K of non-zero bits is imposed for the multiplexed shift-and-add multiplier 10 according to the invention, a possible difference between temporal latencies for different respective multiplicative values is minimized, this difference being even preferably zero, since, according to this optional complement, the number of summation units 30 of the third set 28 is fixed, this fixed number of summation units 30 within the third set 28 depending on the number of multiplexing units 24 itself depending on the maximum number K of non-zero bits, and the computation latency is thus fixed. Indeed, due to the architecture of the multiplier 10 according to the invention, where the shift units 20 are arranged in parallel with each other within the first set 18, where the multiplexing units 24 are also arranged in parallel with each other within the second set 22, a possible variability of the calculation latency is then essentially, or even only, due to a difference in calculation latency within the third set 28 of summation units 30. Now, when as an optional complement the maximum number K of non-zero bits is imposed, this then also makes it possible to impose the number of summation unit(s) 30 within the third set 28, as well as their arrangement, for example in the form of a tree, and the calculation latency associated with this third set 28 of summation units 30 is then predictable, and typically fixed whatever the multiplicative value associated with this maximum number K of non-zero bits.

Furthermore, when the electronic calculator 50 and the various multipliers 10 that it comprises are realized in the form of one or more dedicated integrated circuits, such as one or more ASICs, the shift units 20 are typically realized directly by wiring, and the hardware resources for implementing the summation units 30 of the third set 28 are also less compared to a state-of-the-art shift-and-add multiplier.

Another advantage of using the multiplexed shift-and-add multiplier 10 within the electronic calculator 50 to implement the neural network RN is that it is then no longer necessary to store parameter values, such as weight values, in a memory, as these parameter values are directly encoded through the first set 18 of shift units 20. This then reduces a memory read rate of the calculator 50, and further improves the energy balance of the electronic calculator 50 according to the invention implementing the neural network RN.

Figure 5:
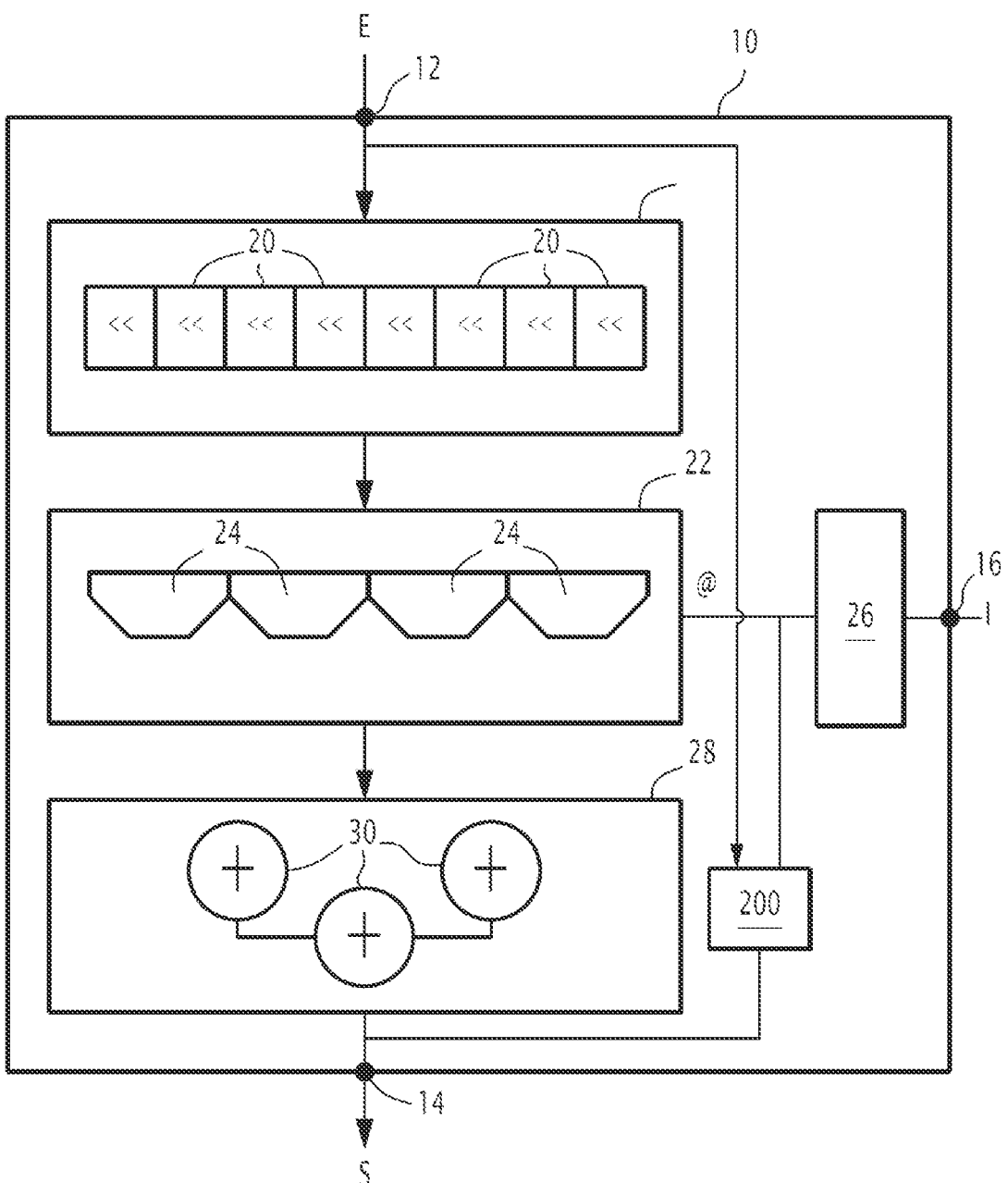
FIG. 5 is a view similar to that of FIG. 1, according to a second embodiment of the invention.
Figure 6:
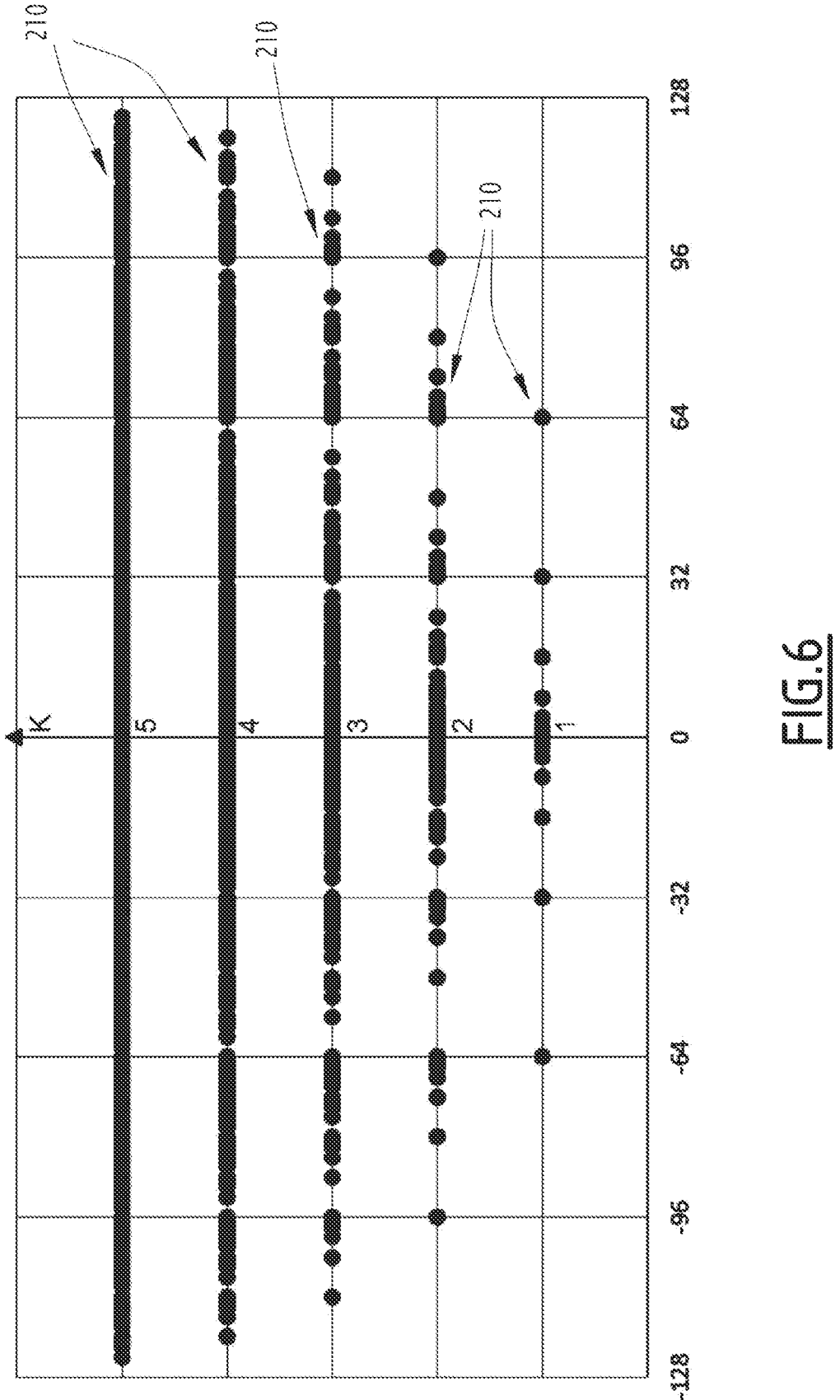
FIG. 6 is a view similar to FIG. 2, according to the second embodiment of the invention.

FIGS. 5 and 6 illustrate a second embodiment of the invention for which the elements similar to the first embodiment, described above, are marked by identical references, and are not described again.

According to the second embodiment, among the binary values E received on the input bus 12 and the respective multiplicative value, at least one value is signed.

According to this second embodiment, if at least one value among the input binary values E and the multiplicative value is signed, the multiplier 10 according to the invention further comprises a calculation unit 200, connected on the one hand to the input bus 12 and on the other hand to the control unit 26.

The calculation unit 200 is then configured to calculate a sign bit of the product of the input received value E and the respective multiplicative value, and then to concatenate the calculated sign bit to the output value of the third set 28 of the summation units 30.

As an optional complement, if at least one of the input values E and the multiplicative value is a signed value, each signed value is encoded with sign bit encoding. This sign bit coding then allows, unlike a two's complement coding, to have a distribution of possible values centered on zero, as represented by FIG. 6. Indeed, this sign bit encoding allows to represent the weak negative values with the same number of bits as the positive values.

In FIG. 6, in a similar way to FIG. 2, the different possible multiplicative values are represented as horizontal rows 210, with each horizontal row 210 representing, in dot form, a succession of possible values for a given value of the maximum number K of non-zero bits in the binary form of the multiplicative value.

With this sign bit coding, the skilled person will then observe that, whatever the value of the maximum number K of non-zero bits in the binary form of the multiplicative value, the possible values of this multiplicative value form a distribution centered on zero.

According to this optional complement, the sign bit of the input value E is ignored in the shift unit 20 and is therefore not taken into account by the first set 18, this sign bit of the input value E being only used by the calculation unit 200.

The calculation unit 200 is in fact preferably configured to calculate said sign bit which is concatenated to the value delivered at the output of the third set 28, according to each signed value among the input values E and the multiplicative value.

The calculation unit 200 includes for example a look-up table, allowing to define, according to the sign bit of the input value E and for each possible multiplicative value, the value of the sign bit to be concatenated to the value delivered at the output of the third set 28.

The operation of this second embodiment is similar to that of the first embodiment and is therefore not described again.

The advantages of this second embodiment are similar to those of the first embodiment and are therefore not described again.

When in addition the distribution of the possible multiplicative values is centered on zero, this then allows a better distribution of the precision for the multiplicative values, and in particular for the parameter values, such as weight and/or bias values, of the neural network RN intended to be implemented by the electronic calculator 50 according to the invention comprising a plurality of multiplexed shift-and-add multipliers 10.

It is thus conceived that the multiplexed shift-and-add multiplier 10 according to the invention allows multiplication operations to be performed for different multiplicative values, while having minimal time latency variability from one multiplicative value to another.

The invention claimed is:

1. A shift-and-add multiplier configured to perform multiplication operations by multiplicative values, each of the multiplicative values comprising, when expressed in binary form, at most a maximum number K non-zero bits, K being an integer greater than or equal to 1, the multiplier being configured to receive, at an input, a value expressed in binary form and to deliver, at an output, a product of the received input value and a respective multiplicative value of the multiplicative values, the shift-and-add multiplier comprising:

a set of a plurality of shift circuits, each shift circuit being connected to the input and configured to perform a shift of P bits of the value received at the input, where P is between 0 and N−1, with N being a number of bits of the binary form at the input, and P varies from one shift circuit to another; and a set of summation circuits configured to sum outputs of the shift circuits, wherein the multiplier further comprises a set of multiplexing circuits, each connected between the set of shift circuits and the set of summation circuits, and control circuitry configured to control the set of multiplexing circuits to select respective outputs of the shift circuits according to the respective multiplicative value and to deliver the respective outputs to the set of summation circuits, and wherein a number of the shift circuits in the shift-and-add multiplier is predetermined based on the maximum number K of non-zero bits of a list of the different multiplicative values associated with the multiplier, and a number of multiplexing circuits contained in the set of multiplexing circuits is strictly greater than or equal to the maximum number K of non-zero bits.

2. The shift-and-add multiplier according to claim 1, wherein if at least one value is signed among (1) the value received at the input, and (2) the respective multiplicative value, each signed value is encoded with sign bit coding.

3. The shift-and-add multiplier according to claim 2, wherein if the respective multiplicative value is signed, the multiplier further comprises a calculation circuit configured to calculate a sign bit of the product of the value received at the input and the respective multiplicative value, and to concatenate the sign bit to the value delivered in output of the set of shift circuits, the calculation circuit being connected to the input and to the control circuitry.

4. The shift-and-add multiplier according to claim 3, wherein the calculation circuit is configured to calculate said sign bit according to each signed value among the values received at the input and the respective multiplicative value.

5. The shift-and-add multiplier according to claim 3, wherein the calculation circuit includes a look-up table.

6. The shift-and-add multiplier according to claim 1, wherein the set of summation circuits further comprises a constant addition circuit configured to add a bias value to the respective multiplicative value.

7. The shift-and-add multiplier according to claim 1, wherein the set of summation circuits is in a form of a tree, the set of summation circuits including, for each respective pair of multiplexing circuits, a summation circuit, of the set of summation circuits, connected to the output of said pair of multiplexing circuits; and if the number of multiplexing circuits is greater than 2, the set of summation circuits includes one or more further summation circuits, each connected to the output of a respective pair of summation circuits.

8. An electronic calculator configured to implement an artificial neural network, the electronic calculator comprising a plurality of shift-and-add multipliers, each being configured to perform multiplication operations by parameter values of the neural network, wherein at least one shift-and-add multiplier is according to claim 1, the multiplicative values being said parameter values.

9. The electronic calculator according to claim 8, wherein said at least one shift-and-add multiplier includes a plurality of shift-and-add multipliers.

10. The electronic calculator according to the claim 8, wherein the electronic calculator is implemented as one or more dedicated integrated circuits.

11. The electronic calculator according to claim 10, wherein each dedicated integrated circuit is an ASIC.

12. The electronic calculator according to claim 8, wherein the parameter values are weights and/or bias values of the neural network.

13. A method for learning parameter values of an artificial neural network to be implemented by an electronic calculator configured to implement the artificial neural network, the electronic calculator comprising a plurality of shift-and-add multipliers, each being configured to perform multiplication operations by parameter values of the neural network, wherein each multiplier is a shift-and-add multiplier configured to perform multiplication operations by multiplicative values, the multiplier being configured to receive, at an input, a value expressed in binary form and to deliver, at an output, a product of the received input value and a respective multiplicative value of the multiplicative values, the multiplier comprising (1) a set of a plurality of shift circuits, each shift circuit being connected to the input and configured to perform a shift of P bits of the value received at the input, where P is between 0 and N−1, with N being a number of bits of the binary form at the input, and P varies from one shift circuit to another; and (2) a set of summation circuits configured to sum outputs of the shift circuits, wherein the multiplier further comprises a set of multiplexing circuits, each connected between the set of shift circuits and the set of summation circuits, and control circuitry configured to control the set of multiplexing circuits to select respective outputs of the shift circuits according to the respective multiplicative value and to deliver the respective outputs to the set of summation circuits which outputs multiplexer values as the parameter values, the method being implemented by the electronic calculator and comprising:

learning parameter values of the neural network, from training data, wherein the method further comprises, prior to the learning, determining a set of allowed values for the parameter values of the neural network, the learning being performed at least according to the set of allowed values, each learned parameter value of the neural network being among the set of allowed values, and wherein the set of allowed values consists of values which, when expressed in binary form, include at most K non-zero bits, wherein K is an integer greater than or equal to 1.

14. The method according to claim 13, wherein the set of allowed values consists of values which, when expressed in binary form, include exactly K non-zero bits.

15. The method according to claim 13, wherein the determining further includes estimating one element among a gradient value look-up table for the set of allowed values and a derivable function modeling the set of allowed values, and wherein the learning is performed via a backpropagation algorithm for calculating the gradient of each parameter of the neural network, the gradient being calculated from the estimated element.

16. The method according to claim 13, wherein K is predefined.

17. The method according to claim 13, wherein K is predefined for each shift-and-add multiplier, K being variable from one multiplier to another multiplier.

18. The method according to claim 13, wherein the parameter values are weights and/or bias values of the neural network.

19. The shift-and-add multiplier of claim 1, wherein the number of shift circuits is equal to a number of distinct positions in which a non-zero bit is found among binary forms of multiplicative values in the list of multiplicative values associated with the shift-and-add multiplier.

* * * * *